J. R. & H. R. GEISMAN.
NETTING TUCKER FOR BASKETS.
APPLICATION FILED MAY 3, 1912.

1,053,378.

Patented Feb. 18, 1913.

Witnesses
Harry M. Test

Inventors,
J. R. Geisman,
H. R. Geisman
By
Attorneys

UNITED STATES PATENT OFFICE.

JOHN R. GEISMAN AND HENRY R. GEISMAN, OF DANBURY, OHIO; SAID HENRY R. GEISMAN ASSIGNOR TO SAID JOHN R. GEISMAN.

NETTING-TUCKER FOR BASKETS.

1,053,378.  Specification of Letters Patent.  Patented Feb. 18, 1913.

Application filed May 3, 1912. Serial No. 694,993.

*To all whom it may concern:*

Be it known that we, JOHN R. GEISMAN and HENRY R. GEISMAN, citizens of the United States, residing at Danbury, in the county of Ottawa and State of Ohio, have invented certain new and useful Improvements in Netting-Tuckers for Baskets; and we do hereby declare the following to be a full, clear, and exact description of the invention, such as will enable others skilled in the art to which it appertains to make and use the same.

This invention relates to improvements in two views in connection with fruit baskets, and particularly for tucking netting between the binding strips and the upper edge of the basket.

The principal object of the invention is to provide a simple and convenient device of this character whereby the fabric covering of a basket, particularly a fruit basket may be laid over the top of the basket, and then be so passed around the edge portion of the cover as to force the same between the binding strips of the upper edge of the basket.

Other objects and advantages will be apparent from the following description and with particular reference to the accompanying drawings.

Figure 1:
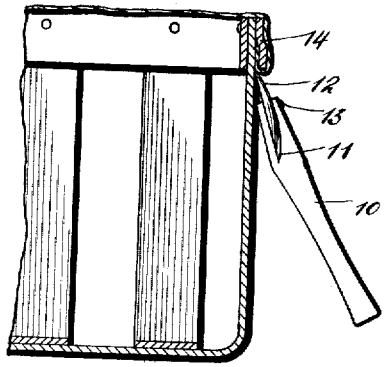
Figure 2:
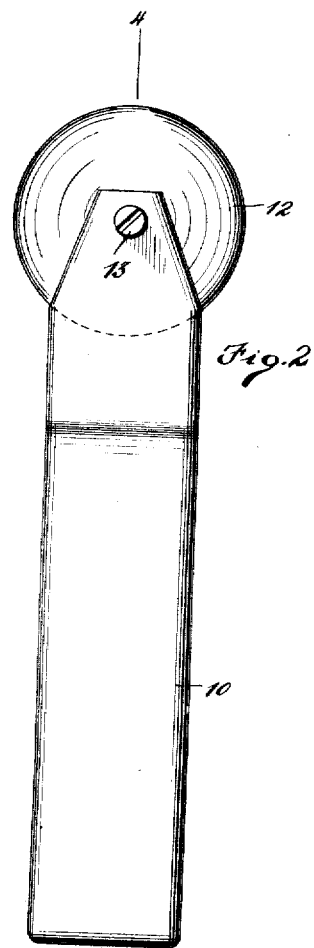
Figure 3:
Figure 4:
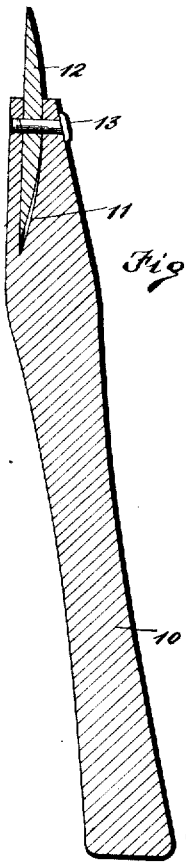

In the drawings: Figure 1 is a sectional view of a basket showing our device in operation, Fig. 2 is a front elevation of our tools, Fig. 3 is a side elevation, Fig. 4 is a vertical longitudinal section on the line 4—4 of Fig. 2.

Referring particularly to the drawings, our device comprises a handle 10 made of any suitable material and in one end of said handle is formed an obliquely arranged kerf 11. Journaled in this kerf is a wheel 12, mounted therein by means of the pin 13. The wheel is plano-convex in cross section.

In the use of the device a basket is filled with fruit, and then the fabric covering which is usually netting, similar to mosquito netting is laid over the top of the basket covering the fruit, so that its marginal edges extend beyond the edges of the basket. We then take our tool holding the handle in one hand, and run the wheel around the edge portion of the netting and force the same between the binding strip 14 of the upper edge of the basket. This obviates the necessity for nailing or tying the cover and it will be readily understood that the cover may be quickly and easily applied to the basket.

We wish it to be understood that this tool can be used for tucking the slats or handles of splint baskets or woven baskets between the binding strips of the basket as well as for tucking the nettings in the baskets.

What is claimed is:—

1. A netting tucker for baskets comprising a handle, having a kerf formed in one end thereof, and a plano-convex rotatable member journaled in said kerf.

2. A netting tucker for baskets comprising a handle, said handle having an obliquely arranged kerf formed in one end, and a plano-convex wheel journaled in said kerf.

In testimony whereof we affix our signatures in presence of two witnesses.

JOHN R. GEISMAN.
HENRY R. GEISMAN.

Witnesses:
GEO. W. BEAMER,
H. M. CLEMONS.

---

Copies of this patent may be obtained for five cents each, by addressing the "Commissioner of Patents, Washington, D. C."